US012470014B2

(12) United States Patent
Song et al.

(10) Patent No.: US 12,470,014 B2
(45) Date of Patent: Nov. 11, 2025

(54) INTEGRATED WATERPROOF SEAL ASSEMBLY AND USE THEREOF

(71) Applicant: SHENZHEN COTRAN NEW MATERIAL CO., LTD, Guangdong (CN)

(72) Inventors: Bin Song, Guangdong (CN); Dong Zhou, Guangdong (CN); Dongdong Zhu, Guangdong (CN)

(73) Assignee: SHENZHEN COTRAN NEW MATERIAL CO., LTD, Guangdong (CN)

( * ) Notice: Subject to any disclaimer, the term of this patent is extended or adjusted under 35 U.S.C. 154(b) by 220 days.

(21) Appl. No.: 18/254,691

(22) PCT Filed: Jul. 6, 2021

(86) PCT No.: PCT/CN2021/104790
§ 371 (c)(1),
(2) Date: May 26, 2023

(87) PCT Pub. No.: WO2022/121297
PCT Pub. Date: Jun. 16, 2022

(65) Prior Publication Data

US 2023/0411901 A1 Dec. 21, 2023

(30) Foreign Application Priority Data

Dec. 7, 2020 (CN) ......................... 202011419281.6

(51) Int. Cl.
*H01R 13/52* (2006.01)

(52) U.S. Cl.
CPC ................................ *H01R 13/5213* (2013.01)

(58) Field of Classification Search
None
See application file for complete search history.

(56) References Cited

U.S. PATENT DOCUMENTS 3,352,563 A * 11/1967 Flair ........................ B63C 11/44 277/926
5,833,495 A * 11/1998 Ito ...................... H01R 13/6592 439/607.51

(Continued)

FOREIGN PATENT DOCUMENTS

CN 2879467 Y 3/2007
CN 101394034 A 3/2009

(Continued)

*Primary Examiner* — Tho D Ta
(74) *Attorney, Agent, or Firm* — NKL Law; Allen Xue

(57) ABSTRACT

An integrated waterproof seal connector has a metal snap-fit member, a plastic support member, a rubber tube, and a supporting tube member. The rubber tube has a first hollow structure portion, connected to a second hollow structure portion through a connecting portion. The supporting member tube is detachably disposed in the first hollow structure portion. The metal snap-fit member is detachably disposed in the plastic support member, and a press type clamping structure portion is arranged on an end of the metal snap-fit member and can be stuck to a wall of the plastic support member. The plastic support member is disposed in the second hollow structure portion. A first end of the second hollow structure portion is provided with a seal structure for sealing a connecting port of a device. A stuck structure protrudes from the first end of the second hollow structure portion.

11 Claims, 8 Drawing Sheets

(56) References Cited

U.S. PATENT DOCUMENTS

| | | | | |
|---|---|---|---|---|
| 7,727,020 | B2 * | 6/2010 | Gladd | H01R 13/521 439/607.41 |
| 7,934,943 | B2 * | 5/2011 | Malstrom | H01R 13/562 439/447 |
| 8,202,130 | B2 * | 6/2012 | Friese | H01R 13/6592 439/736 |
| 2015/0207243 | A1 | 7/2015 | Thomas | |

FOREIGN PATENT DOCUMENTS

| | | | | | |
|---|---|---|---|---|---|
| CN | 201303146 | Y | | 9/2009 | |
| CN | 204304386 | U | | 4/2015 | |
| CN | 208904253 | U | | 5/2019 | |
| CN | 212012015 | U | | 11/2020 | |
| CN | 212012094 | U | | 11/2020 | |
| JP | 2008153225 | A | * | 7/2008 | H01R 13/5213 |

* cited by examiner

INTEGRATED WATERPROOF SEAL ASSEMBLY AND USE THEREOF

CROSS-REFERENCE TO RELATED APPLICATIONS

This application is a U.S. national stage entry of PCT International Application No. PCT/CN2021/104790, filed on Jul. 6, 2021, which claims the priority of the prior application No. 202011419281.6, entitled "INTEGRATED WATERPROOF SEAL SLEEVE AND USE THEREOF", filed with the State Intellectual Property Office of the People's Republic of China on Dec. 7, 2020, the content of which is incorporated herein by reference in its entirety.

TECHNICAL FIELD

The present invention belongs to the field of seal connectors for electrical appliances or data transmission, and particularly relates to a seal connector assembly or a joint device assembly for connecting an electrical appliance or a data transmission device with a cable.

BACKGROUND

When used to transmit electrical signals, data, Radio Frequency (RF) signals, optical signals or the like, an electronic, electrical or data device needs to be connected with a cable. Typically, the cable is inserted into a corresponding receiving recess of the device through a cable connector or joint.

For the waterproof sealing protection of various cable connectors or joints, there are three main products in the prior art: cold-shrink tubes, waterproof rubber tubes, and cold-shrink waterproof devices.

With the upgrading of communication, electrical power, etc. and the increase of the integration degree of devices, the irregularity of cable joints and cable connectors has become obvious, and joints and connectors are required to be detachable in order to facilitate the overhaul, maintenance and replacement of devices.

However, the cold-shrink tubes, the waterproof rubber tubes and the cold-shrink waterproof devices cannot meet the requirements brought by the upgrading of integrated devices for communication, rail transit, electrical power, etc. due to the following defects. For example, after the cold-shrink tube disclosed in Patent CN201420832745.X is assembled, the joint or connector is protected by one-time sealing and cannot be detached, and the joint can only be detached by destroying the cold-shrink tube. As a result, it is inconvenient to detach and install the cable connector, bringing trouble to device overhaul and maintenance, and the cold-shrink tube cannot be reused. Although the waterproof rubber sleeves can be repeatedly assembled, the waterproof rubber sleeves cannot be compatible with the irregularity of cable joints or cable connectors, leading to the failure of waterproofing.

For example, the cold-shrink waterproof device disclosed in Patent CN202020419263.7, which structurally includes a tube body, a snap-fit member, and a supporting member structure, can be permanently waterproof in a non-humid-and-hot environment (such as an indoor environment, etc.), but has the following defect: the snap-fit member is made of plastic, and can be assembled and unlocked through a plastic press member, but the fastening portion of the plastic snap-fit member is in a deformed state under force during use, so the plastic snap-fit member can be easily deformed in the process of outdoor aging, leading to the risk of failure of waterproofing of the product. Consequently, the application of this product in the highly humid and hot environment is limited.

SUMMARY

In order to solve the aforementioned problems in the prior art, the present invention provides a series of products of integrated seal connectors (i.e. a connector assembly or a sleeve) based on a waterproof cold-shrink tube. The products are used as an integrated waterproof seal connector or a port sealing element to enable the sealed connection or protection of device ports and cables in communication, electrical power, the Internet of Things, rail transit, automobiles, meteorology, intelligent household appliances, etc. The seal connectors are suitable for various cables and device ports, and because the seal connectors can be detachably connected with cables and devices, the seal connectors can be reused. Moreover, the seal connectors are convenient to install, maintain and replace, has long-term stable product performance and good sealing effect, and are less affected by the environment. The technical solution of the present invention is described as follows:

<Individual Integrated Waterproof Seal Connector>

An integrated waterproof seal connector comprises a rubber tube, a supporting tube member, a metal snap-fit member, and a plastic support member;

- wherein the rubber tube is of a hollow structure and comprises a first hollow structure portion, second hollow structure portion, and a connecting portion connecting the first hollow structure portion with the second hollow structure portion, and the rubber tube are integrally formed;
- the supporting tube member is detachably arranged in the aforementioned first hollow structure portion for supporting the first hollow structure portion, and the first hollow structure portion can shrink and cling to a cable after the supporting tube member is detached;
- the metal snap-fit member is detachably arranged in the plastic support member, the end of the metal snap-fit member has a press type clamping structure portion capable of being stuck on a wall of the plastic support member;
- the plastic support member is arranged in the second hollow structure portion, a first end of the second hollow structure portion is provided with a sealing structure which can seal a connecting port of a device, and the stuck structures aforementioned of the plastic support member and the metal snap-fit member protrude out of the first end of the second hollow structure portion.

Rubber Tube:

According to an embodiment of the present invention, the second hollow structure portion of the rubber tube, the plastic support member and the metal snap-fit member are tightly fitted in sequence. According to an embodiment of the present invention, the first hollow structure portion is of a hollow round tube structure portion, i.e. a hollow round tube structure portion. The hollow round tube structure portion is 2.0 mm to 30 mm in inner diameter, 0.5 mm to 5.0 mm in thickness, and 20 mm to 200 mm in length. Preferably, the inner diameter is 2.0 mm to 15 mm, the thickness is 1.0 mm to 4.0 mm, and the length is 30 mm to 100 mm; more preferably, the inner diameter is 3.0 mm to 10 mm, the thickness is 1.5 mm to 3.5 mm, and the length is 30 mm to 80 mm.

According to an embodiment of the present invention, the shape of the second hollow structure portion is matched with the shape of the device port to which the integrated waterproof seal connector is connected. For example, the shape of the second hollow structure portion can be a regular or irregular shape, such as a square or rectangular, round, elliptic or triangular shape. Furthermore, the shapes of the plastic support member and the metal snap-fit member are matched with the shape of the second hollow structure portion. Given that the device ports are mostly of square or rectangular shapes, the second hollow structure portion, the plastic support member and the metal snap-fit member are preferably of square or rectangular shapes in the present invention. A first surface, a second surface, a third surface and a fourth surface described below are defined when the general shape of the plastic support member is square, and a first wall, a second wall, a third wall and a fourth wall described below are defined when the general shape of the metal snap-fit member is square.

According to an embodiment of the present invention, the sealing structure of the first end of the second hollow structure portion is a threaded structure for sealing the connecting port of the device. According to an embodiment of the present invention, convex portions are further arranged on the second hollow structure portion, the convex portions are matched with through holes of the plastic support member and outwardly convex block of the metal snap-fit member described below, and the convex portions can cover the through holes of the plastic support member and the outwardly convex block of the metal snap-fit member. Preferably, the convex portion is a cylinder, an elliptic cylinder, or a cuboid. Preferably, the convex portion is integrally formed with the rubber tube. Preferably, the hand-touched surface of the convex portion is a non-smooth surface.

According to an embodiment of the present invention, the combining portion of the second hollow structure portion and the plastic support member is hermetically arranged.

According to an embodiment of the present invention, a sealing structure layer may be arranged at the combining portion of the first hollow structure portion and the supporting tube member. For example, the material of the sealing structure layer is rubber or cement.

Connecting Portion:

According to an embodiment of the present invention, the connecting portion is a hollow special-shaped (irregular-shaped) connecting tube, e.g. a hollow conical tube, a hollow externally threaded tube, or a hollow ellipsoidal tube, preferably a hollow conical tube or a hollow externally threaded tube, and more preferably a hollow conical tube.

According to an embodiment of the present invention, the length of the connecting portion is 10 mm to 100 mm, preferably 20 mm to 60 mm, and more preferably 20 mm to 40 mm.

For example, the connecting portion is preferably a hollow conical tube or a hollow externally threaded tube with a length of 20 mm to 60 mm, and more preferably a hollow conical tube with a length of 20 mm to 40 mm.

According to an embodiment of the present invention, the inner diameter of each section of the connecting portion is greater than that of the first hollow round tube structure portion.

According to an embodiment of the present invention, the material of the rubber tube can be selected from silicone rubber, ethylene propylene diene monomer, nitrile rubber or polyurethane rubber, preferably silicone rubber, ethylene propylene diene monomer or nitrile rubber, and more preferably silicone rubber or ethylene propylene diene monomer.

According to an embodiment of the present invention, other functional additives may be added into the material of the rubber tube according to requirements, or other functional layers may be arranged inside and outside the rubber tube according to requirements. For example, the outer sidewall of the rubber tube is covered to form an anti-corona layer, so as to prevent the corona phenomenon; a shielding layer can be formed on the inner wall of the rubber tube by means of a built-in electrical stress control rubber layer or copper deposition; the outer wall of the rubber tube is provided with a flame-retardant layer or an insect-proof flame-retardant layer (for example, the rubber tube is made of ethylene propylene diene monomer, the flame-retardant layer is made of silicone rubber, or the insect-proof flame-retardant layer is a polytetrafluoroethylene layer, or an insect repellent and/or a flame retardant is added into the rubber tube), and a fire-resisting layer, e.g. a highly bulky glass fiber fire-resisting layer, can also be arranged outside the flame-retardant layer; and an acid-and-alkali-resistant layer, e.g. an EPDM acid-and-alkali-resistant layer, is arranged on the inner wall of the rubber tube.

Metal Snap-Fit Member:

According to an embodiment of the present invention, the metal snap-fit member is a hollow body.

According to an exemplary embodiment of the present invention, the metal snap-fit member is matched with the plastic support member. For example, the metal snap-fit member and the plastic support member are both shaped like a hollow square or rectangular tube.

According to an embodiment of the present invention, the metal snap-fit member is provided with an elastic press type clamping structure portion, and the elastic press type clamping structure portion can be stuck on a wall of the plastic support member after being pressed to pass through the plastic support member and being rebounded then.

According to an exemplary embodiment of the present invention, the metal snap-fit member is formed by a first wall, a second wall, a third wall and a fourth wall in an enclosing manner, the first ends of the four walls are of an integrally connected structure (defining the direction of connection with the device port as upper and the opposite direction as lower, and the first ends of the four walls being the lower end of the metal snap-fit member), the first wall is arranged opposite to the third wall, the second wall is arranged opposite to the fourth wall, except the first ends, portions of the first wall and the two adjacent walls are arranged separately from each other, and portions of the third wall and the two adjacent walls are arranged separately from each other; and second ends (i.e. the upper end of the metal snap-fit member) of the first wall and the third wall are provided with the elastic press type clamping structure portions protruding towards outside of the snap-fit member respectively.

According to an embodiment of the present invention, at least the surface of the clamping structure portions of the metal snap-fit member is provided with an anti-friction layer, so as to reduce the friction between the clamping structure portions and the device port. The anti-friction layer may be a plastic cement layer, a rubber layer, or an abrasion-resistant coating.

According to an embodiment of the present invention, the first wall and the third wall of the metal snap-fit member are symmetrical in shape, structure and arrangement, and the second wall and fourth wall of the metal snap-fit member are symmetrical.

According to an embodiment of the present invention, the first wall of the metal snap-fit member is higher than the two adjacent walls, and the third wall of the metal snap-fit member is higher than the two adjacent walls.

According to an embodiment of the present invention, there is a gap between the first wall of the metal snap-fit member and each of the two adjacent walls, and there is a gap between the third wall of the metal snap-fit member and each of the two adjacent walls.

For example, the width of the gap is 0.2 mm to 20 mm, preferably 0.5 mm to 5 mm, and more preferably 0.5 mm to 2 mm.

According to an embodiment of the present invention, the middle portion of the first wall of the metal snap-fit member is provided with an outwardly convex block, and the middle portion of the third wall of the metal snap-fit member is provided with an outwardly convex block. Preferably, the outwardly convex blocks of the first wall and the third wall are symmetrically arranged. For example, the outwardly convex blocks can be round, elliptic or square structure portions. The outwardly convex blocks serve as convenient-to-press buttons; by pressing the outwardly convex blocks of the elastically movable first wall and third wall, the clamping structure portion of the metal snap-fit member can be deformed, and thereby, the seal connector and the connecting port of the device can be assembled or disassembled.

According to an embodiment of the present invention, the width of the clamping structure portion is 0.3 mm to 10 mm, preferably 0.5 mm to 5 mm, and more preferably 1.0 mm to 3.0 mm.

According to an embodiment of the present invention, both the second wall and fourth wall of the metal snap-fit member are provided with guide slots. For example, each wall is provided with two guide slots. Preferably, the guide slots on each wall are symmetrically arranged. The guide slots can be automatically elastically fastened in matching grooves of the plastic support member, so it is convenient to arrange and retain the metal snap-fit member in the cavity of the plastic support member.

According to an embodiment of the present invention, the guide slot on the second wall of the metal snap-fit member is of a structure formed by a protruding outwardly metal sheet located on the second wall and the second wall, and the guide slot in the fourth wall of the metal snap-fit member is of a structure formed by a protruding outwardly metal sheet located on the fourth wall of the metal snap-fit member and the fourth wall;

wherein the metal sheet on each wall is a regular quadrangle, with only one side being connected with the wall and the surface of the metal sheet being separated from the wall and protruding outwardly.

According to an embodiment of the present invention, the length of the metal snap-fit member is 10 mm to 150 mm, preferably 10 mm to 50 mm, and more preferably 10 mm to 30 mm.

According to an embodiment of the present invention, the width of the metal snap-fit member is 10 mm to 150 mm, preferably 10 mm to 50 mm, and more preferably 10 mm to 30 mm.

According to an embodiment of the present invention, the height of the metal snap-fit member is 5 mm to 150 mm, preferably 10 mm to 40 mm, and more preferably 20 mm to 40 mm.

According to an embodiment of the present invention, the material thickness of the metal snap-fit member is 0.2 mm to 10 mm, preferably 0.3 mm to 5 mm, and more preferably 0.3 mm to 1 mm.

According to an embodiment of the present invention, the material of the metal snap-fit member is selected from a metal material with high elasticity, e.g. stainless steel, brass, phosphor copper or beryllium copper, preferably stainless steel or phosphor copper.

Plastic Support Member:

According to an embodiment of the present invention, the plastic support member is shaped like a hollow square or rectangular tube, and is matched with both the metal snap-fit member and the square or rectangular second hollow structure portion of the rubber tube.

According to an embodiment of the present invention, the plastic support member is fixed in the second hollow structure portion. For example, the plastic support member can be fixed in the second hollow structure portion by bonding injection molding.

According to an embodiment of the present invention, the plastic support member is formed by the first surface, the second surface, the third surface and the fourth surface in an enclosing manner, the first ends (defined as above, i.e. the lower end of the plastic support member) of the four surfaces being of an integrally connected structure, the first surface being arranged opposite to the third surface, and the second surface being arranged opposite to the fourth surface; and the second surface is higher than the two adjacent surfaces and the fourth surface is higher than the two adjacent surfaces, so that the integrally connected structure formed by the second ends in an enclosing manner is provided with two opposite notches in the first surface and the third surface.

According to the technical solution of the present invention, the clamping structure portions arranged at the second ends of the first wall and the third wall on the metal snap-fit member are stuck in the two aforementioned notches of the plastic support member respectively.

According to an embodiment of the present invention, the first surface and the third surface of the plastic support member are symmetrical in shape, structure and arrangement, and the second surface and fourth surface of the plastic support member are symmetrical.

According to an embodiment of the present invention, the width of the notch is 0.1 mm to 5 mm (e.g. mm to 3 mm) greater than that of the clamping structure portion of the metal snap-fit member.

According to an embodiment of the present invention, the first surface of the plastic support member is provided with a through hole at a position close to the first end, the third surface is provided with a through hole at a position close to the first end, and the positions where the through holes are arranged are matched with the outwardly convex block arranged on the metal snap-fit member. Preferably, the positions of the through holes in the first surface and the third surface are symmetrically arranged. For example, the through holes may be round, elliptic or square through holes, preferably matched with the shape of the outwardly convex block arranged on the metal snap-fit member, so that the outwardly convex block can be accommodated.

When the metal snap-fit member is fastened into the plastic support member, the outwardly convex block on the first wall can get into the through hole in the first surface, and the outwardly convex block on the third wall can get into the through hole in the third surface.

According to an embodiment of the present invention, an outwardly extending flange is arranged around the middle portions of the first surface, second surface, third surface and fourth surface of the plastic support member. For example, the width of the flange is 1.0 mm to 30 mm, preferably 1.0 mm to 10 mm, and more preferably 1.0 mm to 5.0 mm. When the integrated waterproof seal connector is connected with an external device, one surface of the flange comes into tight contact with the plane of a device port, and the flange plays a role of positioning the device port. The flange is matched with a threaded structure arranged at the first end of the second hollow structure portion, so as to jointly achieve the effective sealing of the connecting portion between the integrated waterproof seal connector and the device port.

According to an embodiment of the present invention, the second surface and fourth surface of the inner wall of the plastic support member are provided with grooves, which are matched with the metal sheets on the second wall and the fourth wall of the metal snap-fit member to elastically fasten the metal snap-fit member in the plastic support member.

Preferably, the inner wall of the plastic support member is provided with a groove on each of both sides of each of the second surface and the fourth surface, and the grooves are matched with the two metal sheets on each of the second wall and the fourth wall of the metal snap-fit member respectively. Moreover, a guide convex-belt is arranged between the grooves on both sides. The guide convex-belt extends downwardly along the second end of the inner wall (i.e. the upper end of the plastic support member) for a distance shorter than the grooves.

According to an embodiment of the present invention, the material of the plastic support member may be selected from polyetherimide, nylon, polyoxymethylene, polypropylene, or polyphenylene sulfide, preferably polyetherimide, nylon or polyoxymethylene, and more preferably polyetherimide or nylon.

According to an embodiment of the present invention, the length of the plastic support member is 10 mm to 150 mm, preferably 10 mm to 50 mm, and more preferably 10 mm to 30 mm.

According to an embodiment of the present invention, the width of the plastic support member is 10 mm to 150 mm, preferably 10 mm to 50 mm, and more preferably 10 mm to 30 mm.

According to an embodiment of the present invention, the height of the plastic support member is 5 mm to 150 mm, preferably 10 mm to 40 mm, and more preferably 20 mm to 40 mm.

According to an embodiment of the present invention, the material thickness of the plastic support member is 0.5 mm to 10 mm, preferably 0.5 mm to 5 mm, and more preferably 1 mm to 3 mm.

Supporting Tube Member:

According to an embodiment of the present invention, the supporting tube member may be a hollow round tube, the inner diameter of which is, for example, 10 mm to 150 mm, preferably 10 mm to 50 mm, and more preferably 10 mm to 40 mm.

The first hollow structure portion of the rubber tube is expanded and supported by the supporting tube member, and can naturally shrink and cling to the cable after the supporting tube member is detached during use.

Preferably, the supporting tube member is formed by winding a supporting wire, and a pulling portion is left at the first end (defined as above, i.e. the upper end of the supporting tube member).

The material of the supporting tube member may be selected from polyethylene, polypropylene or polyethylene/polypropylene-modified materials.

Plastic Retainer for Fixing Cables:

According to an embodiment of the present invention, the integrated waterproof seal connector further comprises a plastic retainer which is arranged in the metal snap-fit member for fixing a cable.

The plastic retainer is provided with a hollow structure which is matched with the first hollow structure portion, second hollow structure portion and connecting portion of the rubber tube, the plastic support member, and the metal snap-fit member.

For example, if the first hollow structure portion of the rubber tube is a hollow round tube, one end of the plastic retainer is also shaped like a hollow round tube with an outer diameter less than that of the first hollow structure portion; if the sections of the second hollow structure portion, the plastic support member and the metal snap-fit member are rectangular or square, the other end of the plastic retainer is also a hollow rectangular or square body with the side length less than that of the metal snap-fit member.

The plastic retainer is an integrally formed plastic member.

Alternatively, the plastic retainer is of two separate symmetrical structures, the two symmetrical structures are correspondingly provided with fastening structures, and during use, the two symmetrical structures are closed into a whole by the fastening structures, forming a shape arranged in the metal snap-fit member. Preferably, first sides of the two symmetrical structures are correspondingly provided with hinge structures respectively, and the hinge structures are fastened with each other. During use, the hinge structure of one of the symmetrical structure is fastened with that of the other symmetrical structure, and the two symmetrical structures can be rotated around the hinge structures to close. The other sides of the two symmetrical structures are provided with a socket and a fastener corresponding to each other respectively, and when the two symmetrical structures are closed, the fastener is inserted into the socket, so that the two symmetrical structures are closed into a whole. The plastic retainer closed is similar to the plastic support member and the metal snap-fit member, and is also provided with a first wall, a third wall opposite to the first wall, a second wall, and a fourth wall opposite to the second wall. The hinge structures, the socket and the fastener are arranged at positions below the upper ends of the first wall and the third wall (i.e. the upper ends matched with the ends of the second hollow structure portion of the rubber tube, the plastic support member, and the metal snap-fit member, which are preferably rectangular or square in cross section, as defined above) respectively. Preferably, the upper ends of the second wall and the fourth wall of the plastic retainer are provided with outward position-limiting lugs at the center, and when the plastic retainer is arranged inside, the position-limiting lugs are limited by the guide convex-belt arranged in the inner wall of the plastic support member. Preferably, the both upper ends of the second wall and the fourth wall of the plastic retainer extend outwardly to form four protrusions which protrude from both ends of the first wall and the third wall, and the size of the extended ends of the second wall and the fourth wall of the plastic retainer is less than or equal to that of the second wall and the fourth wall of the metal snap-fit member. It was discovered that the second hollow structure portion of the rubber tube, the plastic support member and the metal snap-fit member need to be matched with the device port in size, so when one or two cables in the integrated waterproof seal connector according to the present invention are connected with the device port, the cables are prone to shake to influence signal transmission. Therefore, according to the present invention, the plastic retainer described above is arranged for better fixing the cables, so that the cables are not prone to shake in the integrated waterproof seal connector.

How to Connect the Integrated Waterproof Seal Connector with the Device Port:

The integrated waterproof seal connector according to the present invention can be detachably connected with the device port in any way that can be implemented by those skilled in the art, not limited to the way described above in detail in the present invention that the assembly and disassembly of the seal connector and the connecting port of the device is enabled by pressing the elastically movable clamping structure portions to deform. For example, the device port is in matched threaded connection with the integrated waterproof seal connector according to the present invention. That is, the seal connector is fixedly connected with the device portion by rotation. Alternatively, the port of the integrated waterproof seal connector according to the present invention is provided with an extension, which is fixedly connected with the device port through a bolt and a nut.

<Method of Using Integrated Waterproof Seal Connector>

The present invention further provides a method of using the integrated waterproof seal connector, and the method comprises:

(1) integrating the rubber tube, the supporting tube member, the plastic support member and the metal snap-fit member into a one-piece part;
(2) fastening the hinge structures of the two symmetrical structures of the plastic retainer together;
(3) passing a cable through the one-piece part in step (1);
(4) placing the cable obtained in step (3) onto the plastic retainer obtained in step (2);
(5) fastening the plastic retainer by inserted the fastener into the socket; and
(6) arranging the plastic retainer into the one-piece part.

The method according to the present invention further comprises: inserting the assembled integrated waterproof seal connector into a device port.

According to the method of the present invention, in step (1), the convex blocks of the metal snap-fit member are pressed inwards, so that the metal snap-fit member is inserted into the plastic support member from the upper port or lower port (preferably lower port) of the plastic support member. After fitting, the lower end of the metal snap-fit member is preferably aligned with the lower end of the plastic support member, the clamping structure portion of the upper end of the metal snap-fit member are stuck in the two notches of the plastic support member respectively, and each two metal sheets on the second wall and the fourth wall of the metal snap-fit member are inserted into the grooves of the second wall and the fourth wall of the inner wall of the plastic support member respectively. Subsequently, adhesive is applied on all or part of the areas of the outer surfaces (preferably the structure portions protruded outwardly arranged on the metal snap-fit member) of the plastic support member and the metal snap-fit member integrated as a whole as describe above, the plastic support member and the metal snap-fit member are placed into a mold, rubber is injected, and compression molding is performed, so that the plastic support member and the metal snap-fit member integrated as a whole are wrapped by the rubber tube. Finally, the supporting tube member is arranged into the first hollow structure portion and connecting portion of the rubber tube by pre-expansion.

In step (4), the plastic retainer is inserted from the upper end of the one-piece part, so that the position-limiting lugs on the second wall and the fourth wall of the plastic retainer are positioned to the bottoms of the guide convex-belts of the second wall and the fourth wall in the inner wall of the plastic support member.

<Conjoined Integrated Waterproof Seal Connector>

According to an embodiment of the present invention, the integrated waterproof seal connector may be an individual seal connector, each seal connector corresponding to one device port, i.e. each seal connector being provided with one rubber tube. Alternatively, the integrated waterproof seal connector may be a conjoined seal connector, each seal connector corresponding to a plurality of ports of one device, i.e. each seal connector being provided with a plurality of (two or more, e.g. three to ten or three to five) conjoined rubber tubes, and the conjoined rubber tube is provided with a one-piece second hollow structure portion, corresponding to a plastic support member, a metal snap-fit member, and optionally a plastic retainer, a plurality of separate first hollow structure portions, a plurality of connecting portions, and a plurality of supporting tube member. The one-piece second hollow structure portion is preferably a rectangular body which can be inserted into a plurality of device ports.

<Integrated Waterproof Port Sealing Element>

According to an embodiment of the present invention, the integrated waterproof seal connector according to the present invention can be transformed into a port sealing element to protect a device from the environment when the device has an unused port. Therefore, the present invention also provides an integrated waterproof port sealing element, which comprises a rubber tube, a metal snap-fit member, and a plastic support member;

wherein the rubber tube is of a bottom-closed hollow structure, and comprises an integrally formed second hollow structure portion;

the metal snap-fit member is detachably arranged in the plastic support member, the end provided with a press type clamping structure portion capable of being stuck on a wall of the plastic support member; the plastic support member is arranged in the second hollow structure portion of the rubber tube, a first end of the second hollow structure portion is provided with a sealing structure which can seal a connecting port of a device, and the stuck structures of the plastic support member and the metal snap-fit member protrude out of the first end of the second hollow structure portion.

The second hollow structure portion, the plastic support member and the metal snap-fit member are tightly fitted in sequence.

The port sealing element according to the present invention is the same as the inventive concept of the integrated waterproof seal connector described above, except that since a cable needs to pass through the seal connector, the rubber tube is provided with the first hollow structure portion at the lower end, the supporting member supported on the first hollow structure portion, and the connecting portion connecting the first hollow structure portion with the second hollow structure portion. However, because no cable is passed through and the port needs to be sealed when the integrated waterproof seal connector is used as the port sealing element, there is no first hollow structure portion at the lower end of the rubber tube, and the bottom of the lower end of the rubber tube is sealed. The other parts, such as the second hollow structure portion of the rubber tube, the metal snap-fit member, and the plastic support member, are the same as those of the integrated waterproof seal connector described above in terms of structure, assembly and use, and therefore will not described herein again.

The present invention further provides use of the aforementioned integrated waterproof seal connector in the waterproof sealing of joints and cable connectors of optical/electrical signal transmission devices, such as in communication (preferably 5G communication), Internet of Things, electrical power, rail transit (preferably 5G rail transit), automobiles, meteorology, intelligent power grids, intelligent household appliances, and photovoltaic power generation systems. Specifically, the seal connector according to the present invention can be used for protecting connecting photovoltaic modules to form a power generation module array with designed output power, or protecting a power cable connector for intelligent power grids, protecting a cable connector between the port of a communication base station device and a cable, or protecting a connector for various types of device ports. Therefore, an integrated waterproof seal connector or a port sealing element is provided which can be applied to the waterproof sealing of various cable connectors in the fields of communication, electrical power, Internet of Things, rail transit, automobiles, meteorology, intelligent household appliances, etc., particularly the long-term reliable waterproof sealing of optical/electrical signal transmission devices for 5G communication, 5G rail transit, Internet of Things, etc. in outdoor environments.

Beneficial Effects

The present invention overcomes the problems in the prior art, and provides an integrated waterproof seal connector or a port sealing element, so that long-term reliable waterproof sealing can be performed in an outdoor environment in the process of integration of devices such as communication, electrical power, Internet of Things, rail transit, automobiles, meteorology, intelligent household appliances, etc.

The seal connector is applicable to cable port connectors of various devices, has a good sealing effect, can be used in a plug-and-play manner, is durable and reliable in terms of waterproof sealing, facilitates the overhaul, maintenance and replacement of devices, and can be repeatedly used.

DETAILED DESCRIPTION

In order to make the objects, technical solution and advantages of the present invention more apparent, the present invention is further described in detail with reference to specific embodiments and drawings. Those skilled in the art will appreciate that the present invention is not limited to the drawings and the following embodiments.

Figure 1:
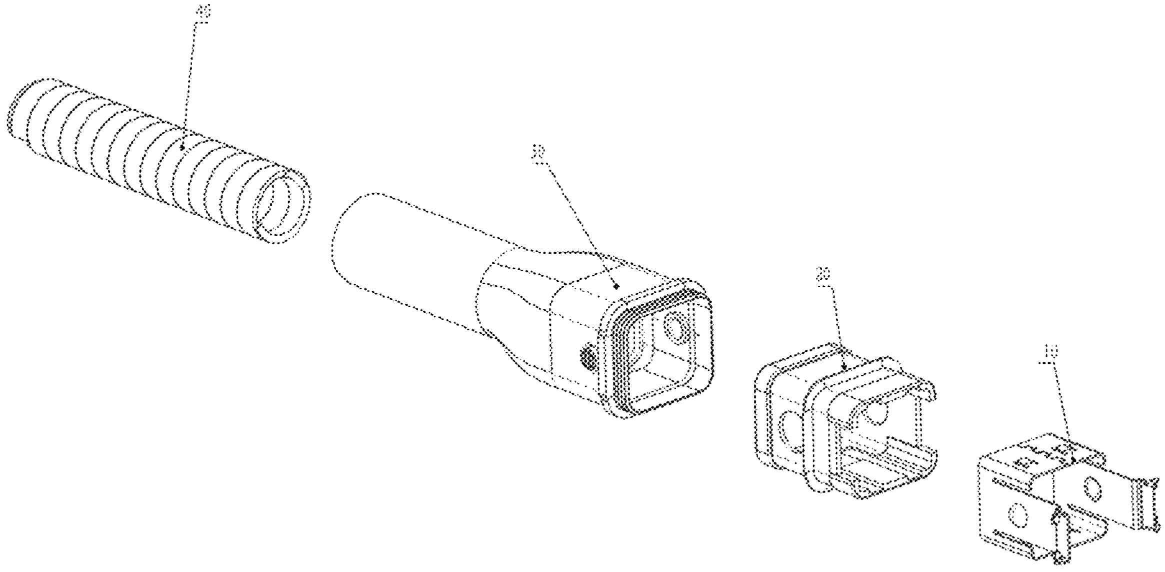
FIG. 1 is a schematic exploded structure diagram of an integrated waterproof seal connector.
Figure 2:
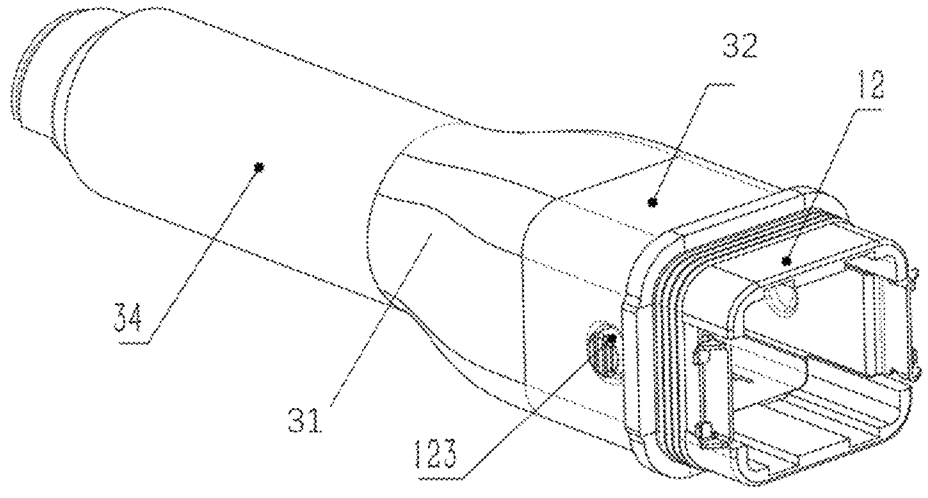
FIG. 2 is a schematic assembled structure diagram of the integrated waterproof seal connector.
Figure 5:
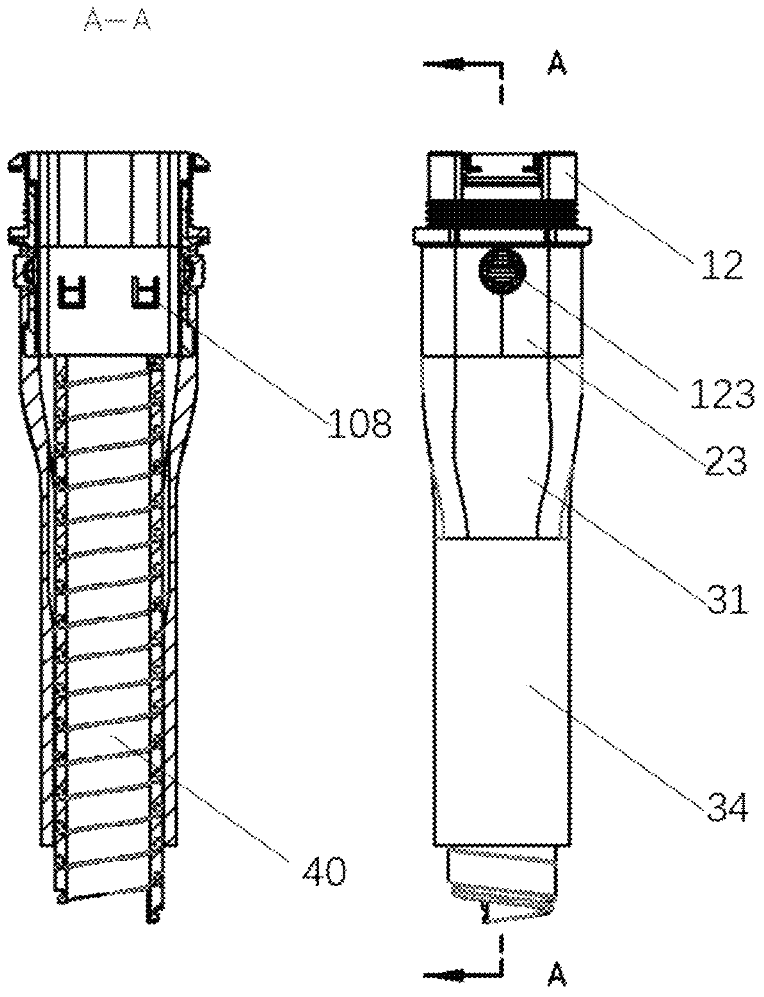
FIG. 5 is a cross-section diagram of the integrated waterproof seal connector assembled.

An integrated waterproof seal connector shown in FIGS. 1, 2 and 5 includes a metal snap-fit member a plastic support member 20, a rubber tube 30, and a supporting tube member 40;

The rubber tube 30 is of a hollow structure, and includes integrally formed and sequentially connected hollow round tube structure portion 34, connecting portion 31 and hollow square structure portion 32, and connecting portion 31 connected with the hollow square structure portion 32 and hollow round tube structure portion 34.

The supporting tube member 40 is detachably arranged in the hollow round tube structure portion 34 for supporting the hollow round tube structure portion 34, and the hollow round tube structure portion 34 can shrink and cling to the cable after the supporting tube member 40 is detached;

the metal snap-fit member 10 is detachably arranged in the plastic support member 20, the end provided with a press type clamping structure portion capable of being stuck and fastened on the wall of the plastic support member 20;

the plastic support member 20 is detachably arranged in the hollow square structure portion 32, the first end of the hollow square structure portion 32 is provided with a sealing structure (e.g. a thread) which can seal a connecting port of a device, and the stuck structures of the plastic support member 20 and the metal snap-fit member 10 protrude out of the first end of the hollow square structure portion 32.

The combining portion where the metal snap-fit member 10 is to be arranged in the plastic support member 20 is denoted by 12, and the combining portion where the metal snap-fit member 10 is to be combined with the plastic support member 20 and the rubber tube 30 is denoted by 123.

The hollow round tube structure portion 34 is a hollow round tube, the body of which is 2.0 mm to 30 mm in inner diameter, 0.5 mm to 5.0 mm in thickness, and 20 mm to 200 mm in length. Preferably, the inner diameter is 2.0 mm to 15 mm, the thickness is 1.0 mm to 4.0 mm, and the length is 30 mm to 100 mm; more preferably, the inner diameter is 3.0 mm to 10 mm, the thickness is 1.5 mm to 3.5 mm, and the length is 30 mm to 80 mm. A sealing structure layer may be arranged in the combining portion of the hollow round tube structure portion 34 and the supporting tube member 40. For example, the material of the sealing structure layer is rubber or cement.

The connecting portion 31 is a hollow special-shaped connecting tube with a length of 10 mm to 100 mm, e.g. a hollow conical tube, a hollow externally threaded tube, or a hollow ellipsoidal tube, preferably a hollow conical tube or a hollow externally threaded tube, and more preferably a hollow conical tube.

The connecting portion 31 is preferably a hollow conical tube or a hollow externally threaded tube with a length of 20 mm to 60 mm, and more preferably a hollow conical tube with a length of 20 mm to 40 mm.

The inner diameter of each section of the connecting portion 31 is greater than that of the hollow round tube structure portion 34.

The material of the rubber tube is selected from silicone rubber, ethylene propylene diene monomer, nitrile rubber or polyurethane rubber, preferably silicone rubber, ethylene propylene diene monomer or nitrile rubber, and more preferably silicone rubber or ethylene propylene diene monomer.

The material of the metal snap-fit member is selected from a metal material with high elasticity, e.g. stainless steel, brass, phosphor copper or beryllium copper, preferably stainless steel or phosphor copper.

The material of the plastic support member is selected from polyetherimide, nylon, polyoxymethylene, polypropylene, or polyphenylene sulfide, preferably polyetherimide, nylon or polyoxymethylene, and more preferably polyetherimide or nylon.

The material of the supporting tube member 40 is selected from polyethylene, polypropylene or polyethylene/polypropylene-modified materials. The supporting tube member is a hollow round tube, the inner diameter of which is 10 mm to 150 mm, preferably 10 mm to 50 mm, and more preferably mm to 40 mm.

The sealing structure of the first end of the second hollow structure portion 32 is of a threaded structure for sealing the connecting port of the device.

Figure 3:
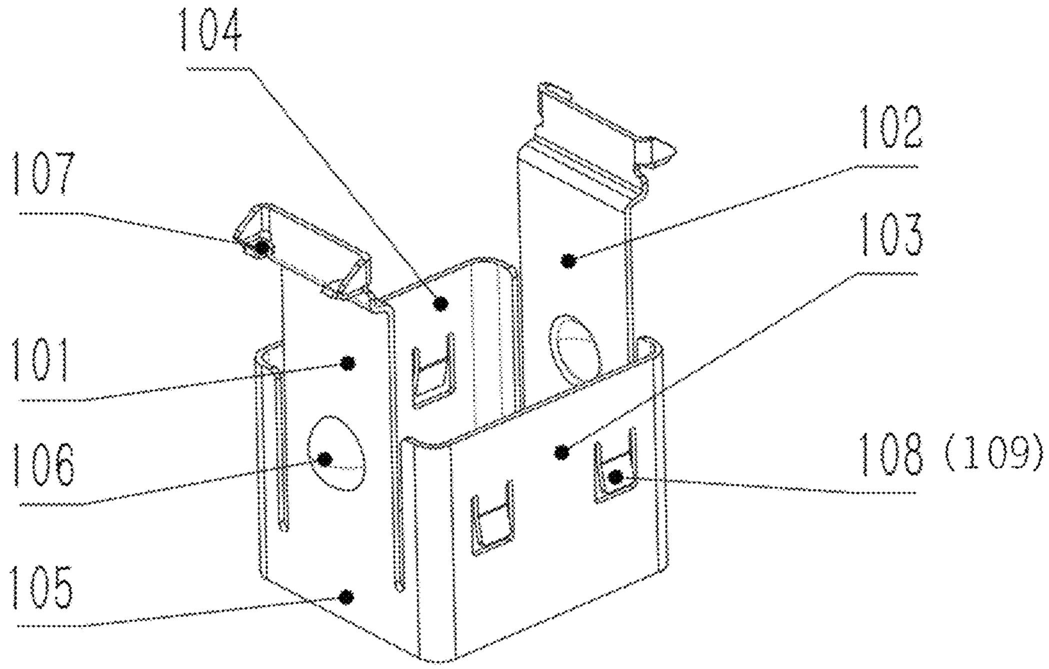
FIG. 3 is a schematic diagram of a metal snap-fit member.

As shown in the schematic structural diagram of the metal snap-fit member 10 in FIG. 3, the metal snap-fit member 10 is of a hollow square tubular structure matched with the plastic support member.

The metal snap-fit member is provided with an elastic clamping structure portion which can be elastically stuck and fastened on the plastic support member after being pressed to pass through the plastic support member and being rebounded then. The elastic clamping structure portion can be stuck and fastened with the connecting port O of the device.

The metal snap-fit member 10 is formed by a first wall 101, a second wall 104, a third wall 102 and a fourth wall 103 in an enclosing manner, first ends of the four walls are of an integrally connected structure 105, the first wall 101 is arranged opposite to the third wall 102, and the second wall 104 is arranged opposite to the fourth wall 103; except the first ends, portions of the first wall 101 and the two adjacent walls are arranged separately from each other, that is, there exist gaps; except the first ends, portions of the third wall 102 and the two adjacent walls are arranged separately from each other, that is, there exist gaps; and second ends of the first wall 101 and the third wall 102 are provided with a clamping structure portion 107 protruding towards outside of the metal snap-fit member respectively. The first wall 101 and the third wall 102 are symmetrical, and the second wall 104 and the fourth wall 103 are symmetrical. The first wall 101 is higher than the two adjacent walls, and the third wall 102 is higher than the two adjacent walls.

The width of the gap is 0.2 mm to 20 mm, preferably 0.5 mm to 5 mm, and more preferably 0.5 mm to 2 mm.

The first wall 101 is provided with an outwardly convex block 106 in the middle portion, and the third wall 102 is provided with an outwardly convex block 106 in the middle portion. The outwardly convex blocks of the first wall and the third wall are symmetrically arranged. The outwardly convex block are round. By pressing the convex block 106, the clamping structure portion 107 of the metal snap-fit member can be deformed and shifted, and thereby, the seal connector and the connecting port of the device can be assembled or disassembled.

The width of the clamping structure portion 107 is 0.3 mm to 10 mm, preferably 0.5 mm to 5 mm, and more preferably 1.0 mm to 3.0 mm.

The second wall 104 and the fourth wall 103 are each provided with guide slots 108. Each wall is provided with two guide slots. The guide slots on each wall are symmetrically arranged. The guide slots are arranged to facilitate the metal snap-fit member to be arranged in the cavity of the plastic support member.

Each guide slot on the second wall of the metal snap-fit member is of a structure formed by a protruding outwardly metal sheet 109 and the second wall 104, and each guide slot on the fourth wall of the metal snap-fit member is of a structure formed by a protruding outwardly metal sheet 109 and the fourth wall 103;

only one side of the metal sheet on each wall is connected with the wall, and the surface of the metal sheet is separated from the wall and slightly protrudes outwardly.

The metal snap-fit member 10 is 10 mm to 150 mm in length, 10 mm to 150 mm in width, 0.2 mm to mm in material thickness, and 5 mm to 150 mm in height, preferably 10 mm to 50 mm in length, mm to 50 mm in width, 0.3 mm to 5 mm in material thickness, and 10 mm to 40 mm in height, and more preferably 10 mm to 30 mm in length, 10 mm to 30 mm in width, 0.3 mm to 1 mm in material thickness, and 20 mm to 40 mm in height.

The surface of the clamping structure portion of the metal snap-fit member may be provided with an anti-friction layer, so as to reduce the friction between the clamping structure portion and the device port. The anti-friction layer may be a plastic cement layer, a rubber layer, or an abrasion-resistant coating.

Figure 4:
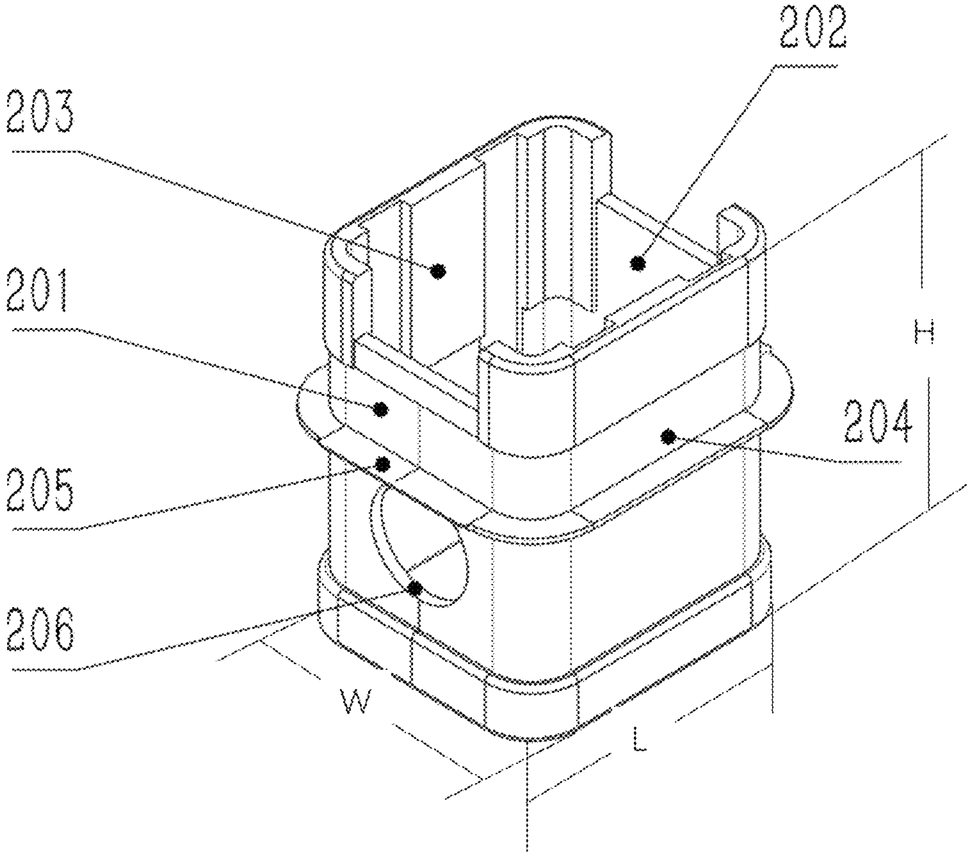
FIG. 4 is a schematic diagram of a plastic support member.

As shown in the schematic structural diagram of the plastic support member 20 in FIG. 4, the plastic support member 20 is of a hollow square tubular structure and is matched with both the metal snap-fit member 10 and the hollow square structure portion 32.

The plastic support member 20 is formed by the first surface 201, the second surface 203, the third surface 202 and the fourth surface 204 in an enclosing manner, the first ends of the four surfaces are of an integrally connected structure, the first surface 201 is arranged opposite to the third surface 202, and the second surface 203 is arranged opposite to the fourth surface 204; the second surface 203 is higher than the two adjacent surfaces and the fourth surface 204 is higher than the two adjacent surfaces, so that the integrally connected structure formed by the second ends in an enclosing manner is provided with two opposite notches in the first surface 201 and the third surface 202.

The first surface 201 is symmetrical with the third surface 202, and the second surface 203 is symmetrical with the fourth surface 204.

The width of the notch is 0.1 mm to 5 mm (e.g. 0.5 mm to 3 mm) greater than that of the clamping structure portion of the metal snap-fit member 10.

Through holes 206 are arranged at a position of the first surface 201 close to the first end and a position of the third surface 202 close to the first end, and the positions where the through holes are arranged are matched with the outwardly convex block arranged on the metal snap-fit member. The positions of the through holes in the first surface and the third surface are symmetrically arranged. The through holes 206, which are round through holes, are matched with the shape of the outwardly convex block 106 arranged on the metal snap-fit member, so that the outwardly convex block 106 can be accommodated.

When the metal snap-fit member is fastened into the plastic support member, the outwardly convex block on the first wall can get into the through hole in the first surface, and the outwardly convex block on the third wall can get into the through hole in the third surface.

A flange 205 is arranged around the middle portions of the first surface 201, second surface 203, third surface 202 and fourth surface 204 of the plastic support member. The width of the flange 205 is 1.0 mm to 30 mm, preferably 1.0 mm to 10 mm, and more preferably 1.0 mm to 5.0 mm. When the integrated waterproof seal connector is connected with the external device, one surface of the flange comes into tight contact with the plane of the device port, and the flange can abut against the outer end of the connecting port O of the device, not only playing a position-limiting role to prevent the second hollow structure portion from being completely embedded into the connecting port O when the second hollow structure portion is inserted, but also cooperating with the threaded structure of the first end of the second hollow structure portion to seal the outer end of the connecting port O, preventing water from getting into the device.

The inner wall of the plastic support member 20 is provided with guide grooves, which are matched with the metal sheets 108\109 on the second wall and the fourth wall of the metal snap-fit member to elastically fasten the metal snap-fit member in the plastic support member, and the grooves in the plastic support member has a position-limiting effect.

The plastic support member 20 is 10 mm to 150 mm in length L, 10 mm to 150 mm in width W, 0.5 mm to 10 mm in material thickness, and 5 mm to 150 mm in height H, preferably 10 mm to 50 mm in length, 10 mm to 50 mm in width, 0.5 mm to 5 mm in material thickness, and 10 mm to 40 mm in height, and more preferably 10 mm to 30 mm in length, 10 mm to 30 mm in width, 1 mm to 3 mm in material thickness, and 20 mm to 40 mm in height.

Convex portions are further arranged on the hollow square structure portion 32, the convex portions are matched with the through holes 206 of the plastic support member and the outwardly convex blocks 106 of the metal snap-fit member, and the convex portions can cover the through holes 206 of the plastic support member and the outwardly convex blocks 106 of the metal snap-fit member. That is, the convex portions may also be referred to as combining portions of the hollow square structure portion, the plastic support member, and the metal snap-fit member. The convex portion is a cylinder. The convex portions and the rubber tube 30 are integrally formed. The hand-touched surface of the convex portion is a non-smooth surface.

The combining portion of the hollow square structure portion 32 and the plastic support member 20 is hermetically arranged.

Figure 6:
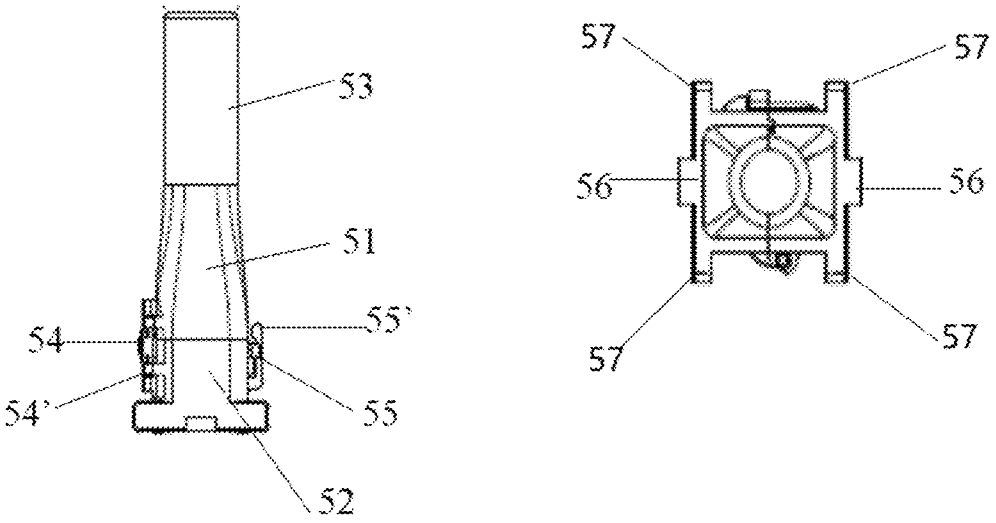
FIG. 6 is a schematic structure diagram of a plastic retainer.

FIG. 6 shows a schematic structure diagram of a plastic retainer 50 for fixing a cable. The plastic retainer is arranged in the metal snap-fit member. The plastic retainer 50 is of a hollow structure, and comprises a hollow round tube structure portion 53, a hollow square structure portion 52 and a connecting portion 51 for connecting both above after two symmetrical structures are closed into a whole.

The two symmetrical structures are correspondingly provided with fastening structures, and during use, the two symmetrical structures are closed into a whole to form the hollow structure. One side of the two symmetrical structures is correspondingly provided with hinge structures 54 and 54' respectively, and the hinge structures are fastened with each other. During use, the hinge structures 54 and 54' are fastened together, and the two symmetrical structures can be rotated around the hinge structures to close. The other side of the two symmetrical structures is provided with a socket 55 and a fastener 55' corresponding to each other respectively, and when the two symmetrical structures are closed, the fastener is inserted into the socket, so that the two symmetrical structures are formed into a whole. The plastic retainer closed is similar to the plastic support member and the metal snap-fit member, and is also provided with a first wall, a third wall opposite to the first wall, a second wall, and a fourth wall opposite to the second wall. The hinge structures, the socket and the fastener are arranged at positions below the ends of the first wall and the third wall respectively.

The upper ends of the second wall and the fourth wall of the plastic retainer are provided with position-limiting lugs 56 at the center, and when the plastic retainer is arranged inside, the position-limiting lugs are limited by the guide convex-belts formed between two guide grooves arranged in the second and fourth wall of the plastic support member. Both ends of the second wall and the fourth wall extend outwardly to form four protrusions 57 which protrude from both ends of the first wall and the third wall, and the size of the extended ends of the second wall and the fourth wall is less than or equal to that of the second wall and the fourth wall of the metal snap-fit member.

Figure 7:
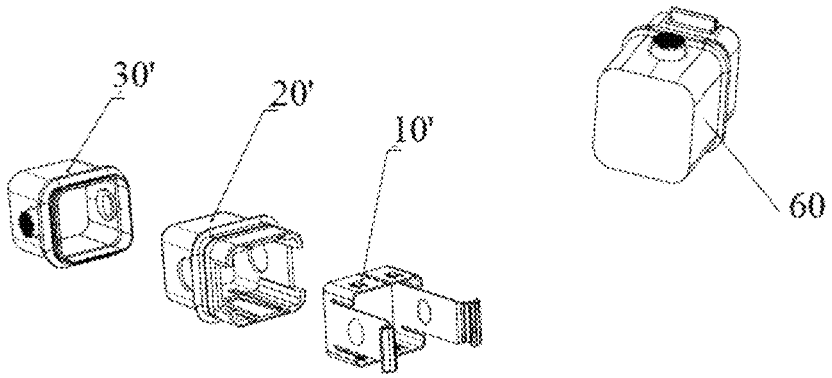
FIG. 7 is a schematic structure diagram of an integrated waterproof port sealing element.
Figure 8:
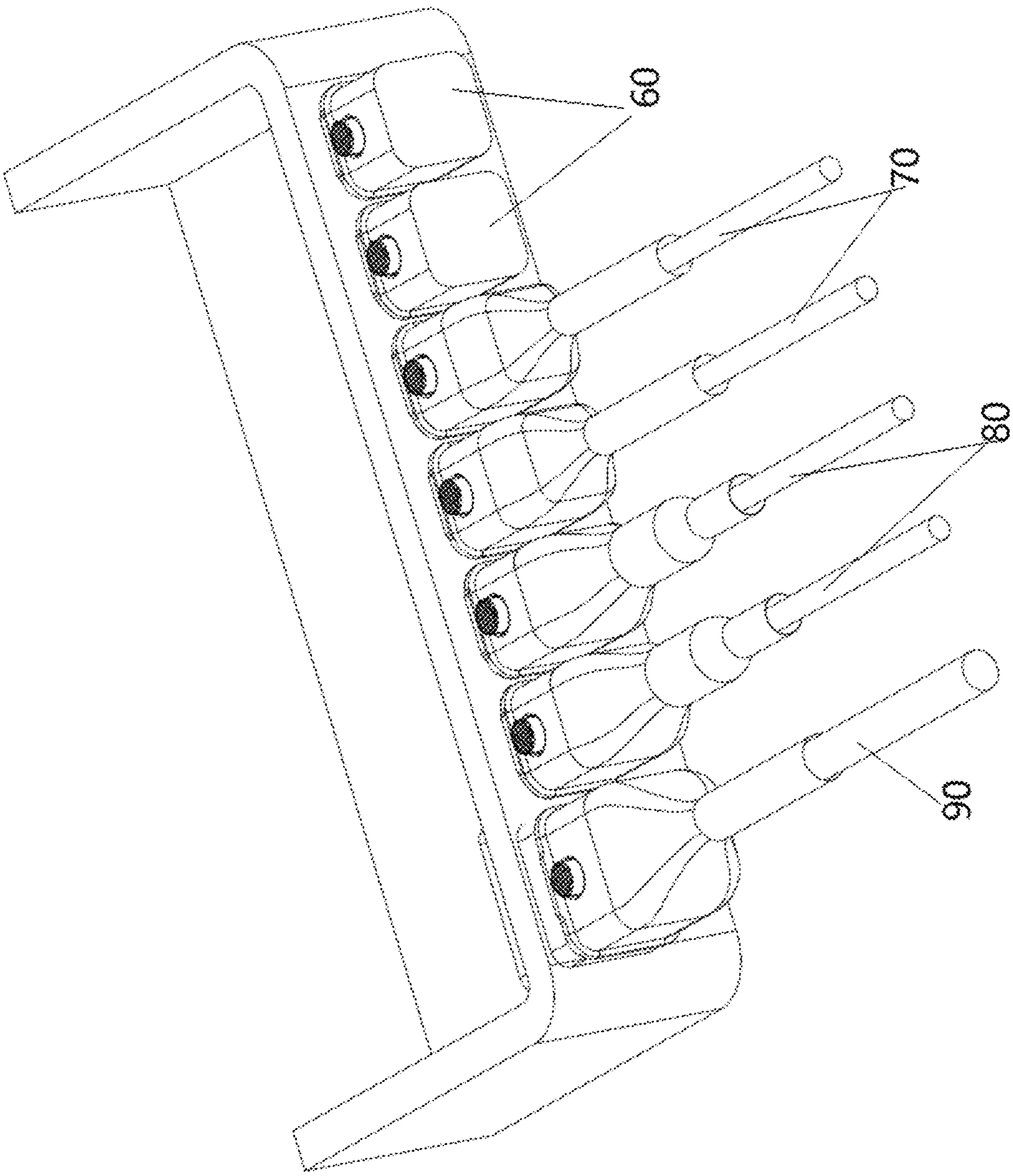
FIG. 8 is a diagram of an application example of the integrated waterproof seal connector or the port sealing element.

The integrated waterproof seal connector according to the present invention may also be transformed into a port sealing element 60 to protect the unused port of the device from the environment. The structure of the port sealing element 60 is shown in FIG. 7, and its application is shown in FIG. 8. The port sealing element includes a metal snap-fit member 10', a plastic support member 20', and a second hollow square structure portion 30' of the rubber tube, with the bottom of the second hollow square structure portion 30' being sealed;

The aforementioned port sealing element 60 according to the present invention is the same as the inventive concept of the integrated waterproof seal connector described above, except that since a cable needs to pass through the seal connector, the rubber tube is provided with the first hollow structure portion at the lower end and the supporting member supported in the first hollow structure portion. However, because no cable is passed through and the port needs to be sealed, there is no first hollow structure portion at the lower end of the rubber tube, and the bottom of the lower end of the rubber tube is sealed. The structures, assembly and use of the other parts are the same as those of the integrated waterproof seal connector described above, and therefore will not described herein again. Referring to FIG. 8, there may be different application ports in a single device, so different models and types of integrated waterproof seal connectors or port sealing elements of the present invention may be used in cooperation. As shown in FIG. 8, the connector 90 is an integrated waterproof seal connector with large dimensions; the connector 80 is an integrated waterproof seal connector with a plastic retainer (since the plastic retainer is arranged inside, the upper section of the first hollow portion of the rubber tube has an obvious projection, and therefore, the diameter is different from that of the lower section); the connector 70 is an integrated waterproof seal connector without a plastic retainer inside; and the port sealing element 60 protects the device port.

Figure 9:
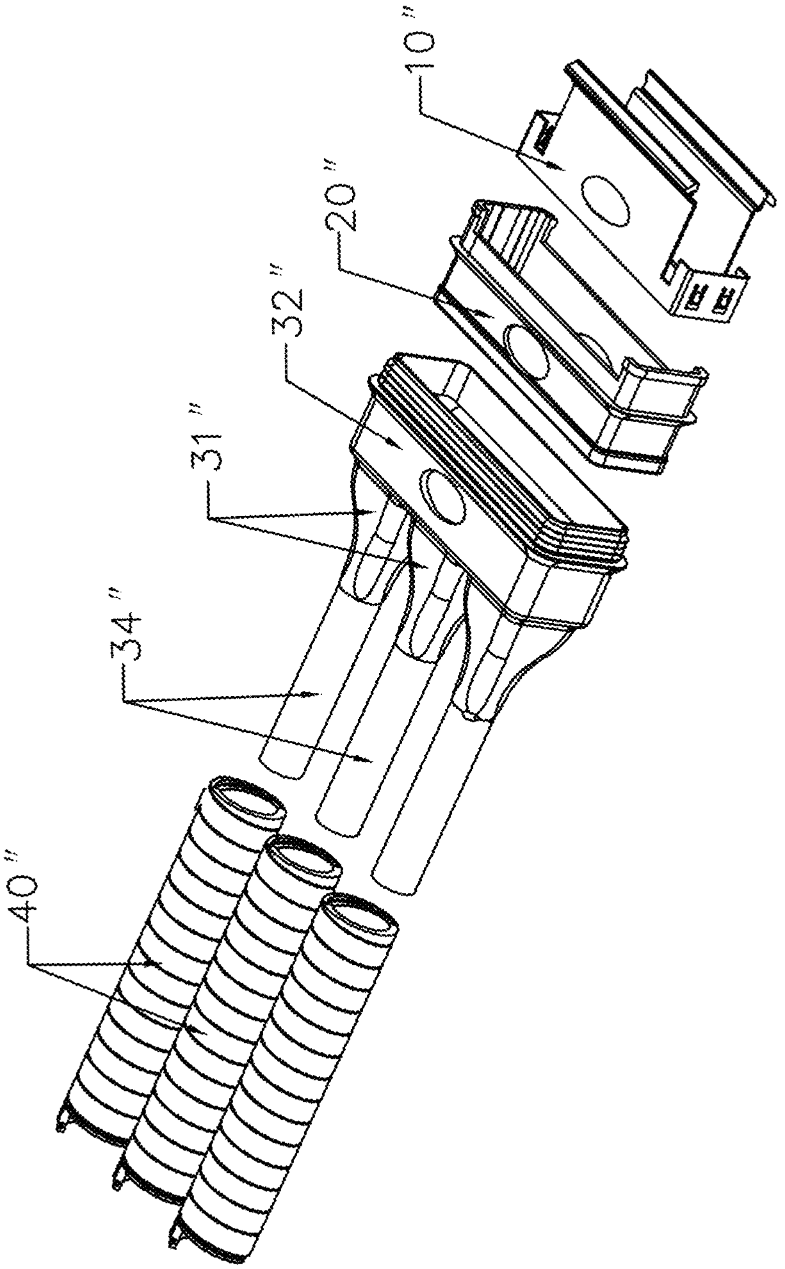
FIG. 9 is a schematic structure diagram of a conjoined integrated waterproof seal connector.

Referring to FIG. 9, the integrated waterproof seal connector of the present invention may also be of a conjoined type. Specifically, the conjoined integrated waterproof seal connector according to the embodiment of the present invention includes a conjoined rubber tube 30", a metal snap-fit member a plastic support member 10", and supporting tube members 40"; and the conjoined rubber tube includes a plurality of (two or more, e.g. three to ten or three to five) separate round first hollow structure portions 34", a plurality of (two or more, e.g. three to ten or three to five) connecting portions 31", and a one-piece square second hollow structure portion 32". After the supporting tube members are pulled out, each of the round first hollow structure portions 34" can cling to a cable, thus sealing the cable. The number of the connecting portions 31" is the same as that of the round first hollow structure portions 34", and each of the round first hollow structure portions 34" is connected to the one-piece square second hollow structure portion 32" through one connecting portion 31" respectively. The number of the metal snap-fit member and the plastic support member is the same as that of the square second hollow structure portion 32", and they are of a one-piece type, and the specific structures and assembly are the same as those of the individual seal connector described above.

Figure 10:
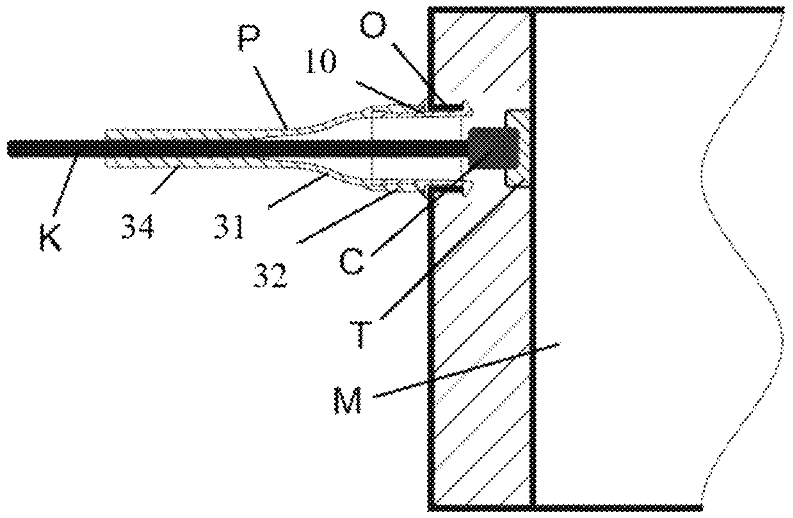
FIG. 10 is a diagram of an application example of the integrated waterproof seal connector.

The method of using the integrated waterproof seal connector of the aforementioned embodiment will be exemplarily described below, and the integrated waterproof seal connector according to the embodiment of the present application is not limited to the following specific application example. Taking a 5G communication device in an outdoor humid-and-hot environment as an example (FIG. 10, the seal connector according to the embodiment is simplified to mainly highlight the connection between the seal connector and the device). In general, such device needs at least two connecting cables K, one is an optical cable for transmitting signals, and the other is an electrical cable. The two cables need to enter the device through a connecting port O of the device M to connect with the device M, so that the device M can have the function of transmitting and receiving signals. Moreover, because the optical cable and the electrical cable need to be connected with an interface T of the device M through a cable connector C, there is a risk of water seepage at the connecting port O of the device M, thus requiring waterproof sealing, particularly long-term reliable waterproof sealing in the outdoor environment. For the aforementioned device M, waterproof adhesive tapes, cold-shrink tubes, heat-shrinkable connectors and waterproof rubber sleeves in the prior art cannot meet the requirement of sealing. When the seal connector P according to the embodiment of the present invention is assembled, firstly, the cable with the cable connector C is passed through the hollow round tube structure portion expanded by the supporting tube member, the hollow square structure portion and the connecting portion, integrally formed with the hollow round tube structure portion, and the metal snap-fit member located inside the plastic support member, and the cable connector C protrudes out of the port of the metal snap-fit member; secondly, the cable connector C is inserted and connected to the interface T of the device M; thirdly, the metal snap-fit member is stuck to the connecting port O of the device M, the thread on the hollow square structure portion seals the connecting port O, and a flange 10 on the hollow square structure portion abuts against the outer end of the connecting port O, so that the hollow square structure portion and the connecting port O are sealed; finally, the supporting tube member is shrunk, a supporting rope at the end of the supporting tube member is pulled, so that the rubber tube body is elastically shrunk round by round to compress the cable, and thereby, the cable is compressed to be sealed by the rubber tube body. Thus, the seal connector clings to the cable for sealing and the hollow square structure portion seals the connecting port O, forming an overall sealing structure, which can prevent external water and dust from getting into the device M. During disassembling, the convex portions on the first wall and the third wall of the hollow square structure portion 32 (covering the through holes of the plastic support member and the outwardly convex blocks of the metal snap-fit member) are pressed, and the clamping structure portion at the top of the metal snap-fit member is deformed and shifted, and then unlocked, so that the seal connector according to the embodiment of the present invention can be removed from the connecting port O of the device M. Because the hollow square structure portion 32 and the connecting portion 31 of rubber tube does not cling to the cable or the cable connector for sealing, the rubber tube can move along the direction of the cable and cause displacement, providing an operating space for disassembling the cable connector. After the cable connector C is disassembled from the device M, the cable connector can be disassembled utilizing the operating space without destroying the seal connector according to the embodiment of the present invention. Thus, the seal connector according to the embodiment of the present invention can be reused, not only facilitating the assembling and disassembling of the cable connector but also reducing the cost.

Test Example

The test method is as follows: for application in a highly humid environment, it was necessary to test the product under constant humidity and heat; the integrated waterproof seal connector in Embodiment 1 was assembled on a device; referring to GB/T 2423.3-2016 Environmental Testing for Electric and Electronic Products—Part 2: Testing Method—Test Cab: Damp heat, Steady state, a temperature of 75° C.±2° C., a relative humidity of 95%±3%, and a time of 1080 h were chosen, and the product was soaked in water 1 m deep for 168 h after aging, and was checked to see whether the water had seeped into the cavity of the device. The test result is as follows:

| | Waterproof Effect | Sample Inspection | Detection and Analysis |
|---|---|---|---|
| Embodiment 1: Integrated waterproof seal connector | No water seepage, waterproof effect qualified | No deformation of the metal clamping structure portion | The metal clamping structure portion is not deformed under the constant-temperature-and-humidity environment, so the waterproof effect is durable and reliable. |

The embodiments of the present invention have been described above. However, the present invention is not limited to the embodiments described above. Any modification, equivalent, improvement and the like made without departing from the spirit and principle of the present invention shall fall within the protection scope of the present invention.

The invention claimed is:

1. An integrated waterproof seal connector, comprising a rubber tube, a supporting tube member, a metal snap-fit member, and a plastic support member; wherein the rubber tube is of a hollow structure and comprises a first hollow structure portion, a second hollow structure portion, and a connecting portion connecting the first hollow structure portion with the second hollow structure portion, which are integrally formed;

the supporting tube member is detachably arranged in the first hollow structure portion for supporting the first hollow structure portion, the first hollow structure portion being configured to shrink and cling to a cable after the supporting tube member is detached;

the metal snap-fit member is detachably arranged in the plastic support member, wherein an end of the metal snap fit member is provided with a press type elastic clamping structure portion configured to be stuck on a wall of the plastic support member; and the plastic support member is arranged in the second hollow structure portion, a first end of the second hollow structure portion is provided with a sealing structure which is configured to seal a connecting port of a device, and stuck structures of the plastic support member and the metal snap-fit member protrude out of the first end of the second hollow structure portion.

2. The integrated waterproof seal connector according to claim 1, wherein the metal snap-fit member is provided with the press type elastic clamping structure portion, the elastic clamping structure portion is configured to rebound and to be elastically stuck on the wall of the plastic support member after being pressed to pass through the plastic support member;

and/or the metal snap-fit member is formed by a first wall, a second wall, a third wall and a fourth wall in an enclosing manner, first ends of the four walls are of an integrally connected structure, the first wall is arranged opposite to the third wall, and the second wall is arranged opposite to the fourth wall;

except for the first ends, portions of the first wall and two adjacent walls thereof are arranged separately from each other; except for the first ends, portions of the third wall and two adjacent walls thereof are arranged separately from each other; and second ends of the first wall and the third wall are each provided with the press type elastic clamping structure portion protruding towards an outer side of the metal snap-fit member respectively; and/or the first wall of the metal snap-fit member is higher than the two adjacent walls, and the third wall of the metal snap-fit member is higher than the two adjacent walls; and/or both the second wall and the fourth wall of the metal snap-fit member are provided with guide slots; each of the guide slots is of a structure formed by a metal sheet located on a corresponding wall, wherein only one side of the metal sheet is connected with the corresponding wall, and a surface surrounded by the other three sides of the metal sheet is separated from the corresponding wall and protrudes outwardly.

3. The integrated waterproof seal connector according to claim 1, wherein the plastic support member is formed by a first surface, a second surface, a third surface and a fourth surface in an enclosing manner, with first ends of the four surfaces being of an integrally connected structure, the first surface being arranged opposite to the third surface, and the second surface being arranged opposite to the fourth surface; the second surface is higher than its two adjacent surfaces and the fourth surface is higher than its two adjacent surfaces, so that the integrally connected structure formed by second ends of the four surfaces in an enclosing manner is provided with two opposite notches in the first surface and the third surface, and the press type elastic clamping structure portions arranged on the metal snap-fit member are stuck in the two opposite notches of the plastic support member respectively; and/or the first surface and the third surface of the plastic support member are provided with through holes close to the first ends of the first and the third surfaces, and positions of the through holes match with convex blocks arranged on the metal snap-fit member; and/or wherein an inner wall of each of the second and the fourth surfaces of the plastic support member is provided with guide grooves, and the guide grooves match with the metal sheets on the second wall and the fourth wall of the metal snap-fit member.

4. The integrated waterproof seal connector according to claim 1, wherein the first hollow structure portion is a hollow round tube structure portion, a sealing structure layer is arranged at a combining portion of the hollow round tube structure portion and the supporting tube member; and/or the connecting portion is a hollow conical tube, a hollow externally threaded tube, or a hollow ellipsoidal tube, and an inner diameter of each section of the connecting portion is greater than an inner diameter of the hollow round tube structure portion; and/or the sealing structure of the first end of the second hollow structure portion is of a threaded structure for sealing the connecting port of the device.

5. The integrated waterproof seal connector according to claim 1, further comprising a plastic retainer which is arranged in the metal snap-fit member for fixing the cable;

wherein the plastic retainer is provided with a hollow structure matching with the first hollow structure portion, the second hollow structure portion and the connecting portion of the rubber tube, the plastic support member, and the metal snap-fit member.

6. The integrated waterproof seal connector according to claim 5, wherein the plastic retainer is of two separate symmetrical structures, the two separate symmetrical structures are correspondingly provided with fastening structures, and during use, the two symmetrical structures are closed into a whole by the fastening structures, forming a shape arranged in the metal snap-fit member; and/or the plastic retainer is provided with a first wall, a second wall, a third wall and a fourth wall after being enclosed into a whole, upper ends of the second wall and the fourth wall are provided with position-limiting lugs at the center, and when the plastic retainer is arranged in the metal snap-fit member, the position-limiting lugs are limited by guide convex-belts arranged between the guide grooves in inner wall of the plastic support member; and/or both ends of the second wall and the fourth wall of the plastic retainer extend outwardly to form four protrusions which protrude from the both ends of the first wall and the third wall, and the size of the extended ends of a size of second wall and the fourth wall is less than or equal to that of the second wall and the fourth wall of the metal snap-fit member.

7. A method of using the integrated waterproof seal connector according to claim 6, comprising:

(1) integrating the rubber tube, the supporting tube member, the plastic support member and the metal snap-fit member into a one-piece part;

(2) fastening the hinge structures of the two symmetrical structures of the plastic retainer together;

(3) passing a cable through the one-piece part in step (1);

(4) placing the cable obtained in step (3) onto the plastic retainer obtained in step (2);

(5) fastening a socket and a fastener of the plastic retainer; and (6) arranging the plastic retainer into the one-piece part.

8. A waterproof sealing connection between a cable and a port of an optical/electrical signal transmission device, comprising the integrated waterproof seal connector according to claim 1.

9. The waterproof sealing connection of claim 8, wherein the integrated waterproof seal connector is used for protection of connecting photovoltaic modules to form a power generation module array with a designed output power, protection of a power cable connector for intelligent power grids, or protection of a cable connector between a port of a communication base station device and a cable.

10. A conjoined integrated waterproof seal connector, comprising a conjoined rubber tube, a metal snap-fit member, a plastic support member, and supporting tube members; wherein the conjoined rubber tube comprises a plurality of separate first hollow structure portions, a plurality of connecting portions, and a one-piece second hollow structure portion, the number of the connecting portions and the supporting tube members are the same as the number of the first hollow structure portions, each of the first hollow structure portions is connected to the one-piece second hollow structure portion through one of the connecting portions respectively, and the metal snap-fit member and the plastic support member are both of a one-piece structure matching with the second hollow structure portion.

11. An integrated waterproof port sealing element, comprising a rubber tube, a metal snap-fit member, and a plastic support member;

wherein the rubber tube is of a bottom-closed hollow structure, and comprises an integrally formed second hollow structure portion;

the metal snap-fit member is detachably arranged in the plastic support member, an end of the metal snap fit member provided with a press elastic type clamping structure portion capable of being stuck on a wall of the plastic support member; and the plastic support member is arranged in the second hollow structure portion of the rubber tube, a first end of the second hollow structure portion is provided with a sealing structure which can seal a connecting port of a device, and the stuck structures of the plastic support member and the metal snap-fit member protrude out of the first end of the second hollow structure portion.

* * * * *